Figure 4:
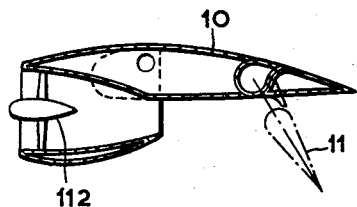

Nov. 12, 1963  R. F. CREASEY ET AL  3,110,456
VERTICAL TAKE-OFF AIRCRAFT
Filed Oct. 30, 1961  3 Sheets-Sheet 1
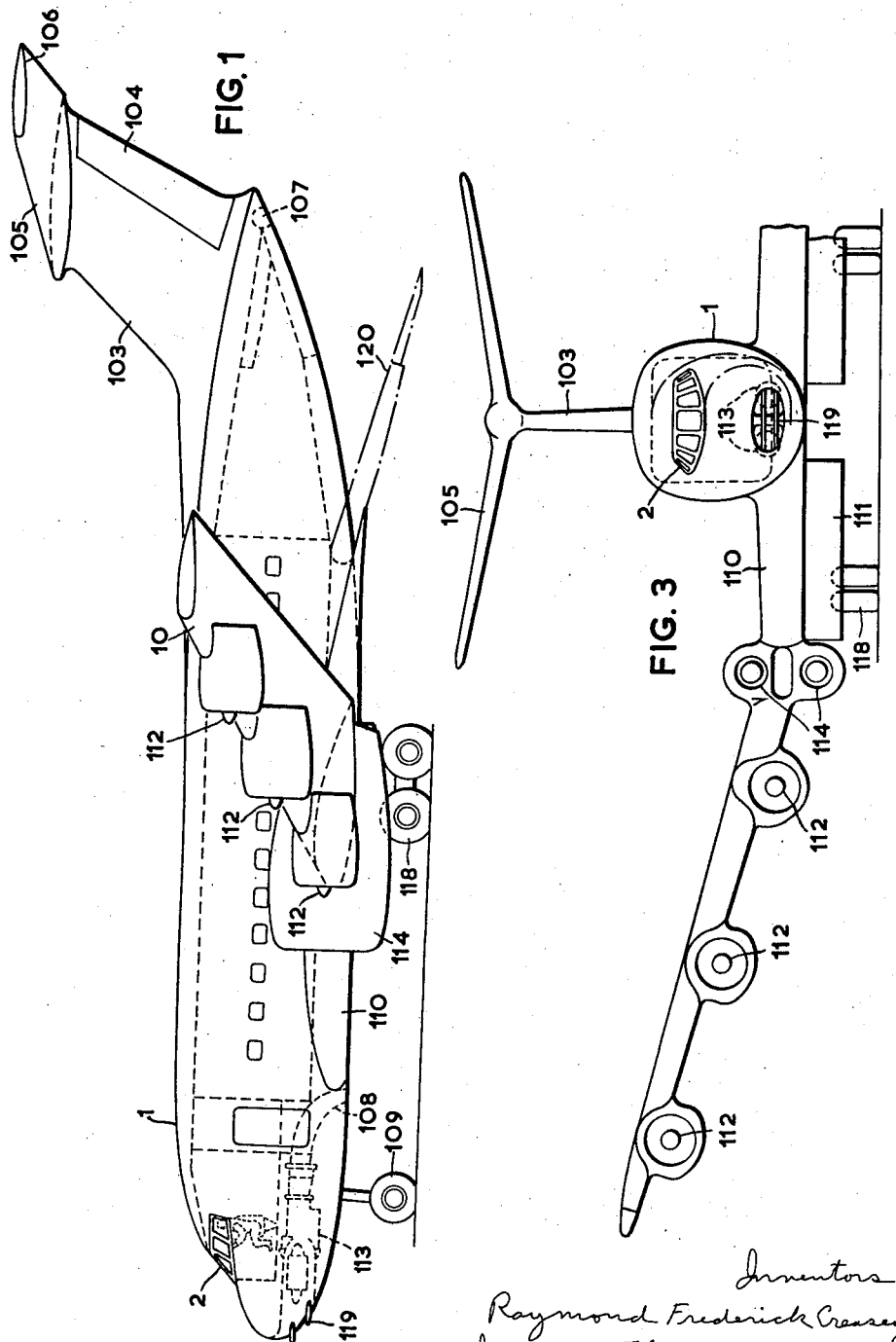
Inventors
Raymond Frederick Creasey
Joseph Thomas Froud
By Stevens, Davis, Miller, & Mosher
Attorneys

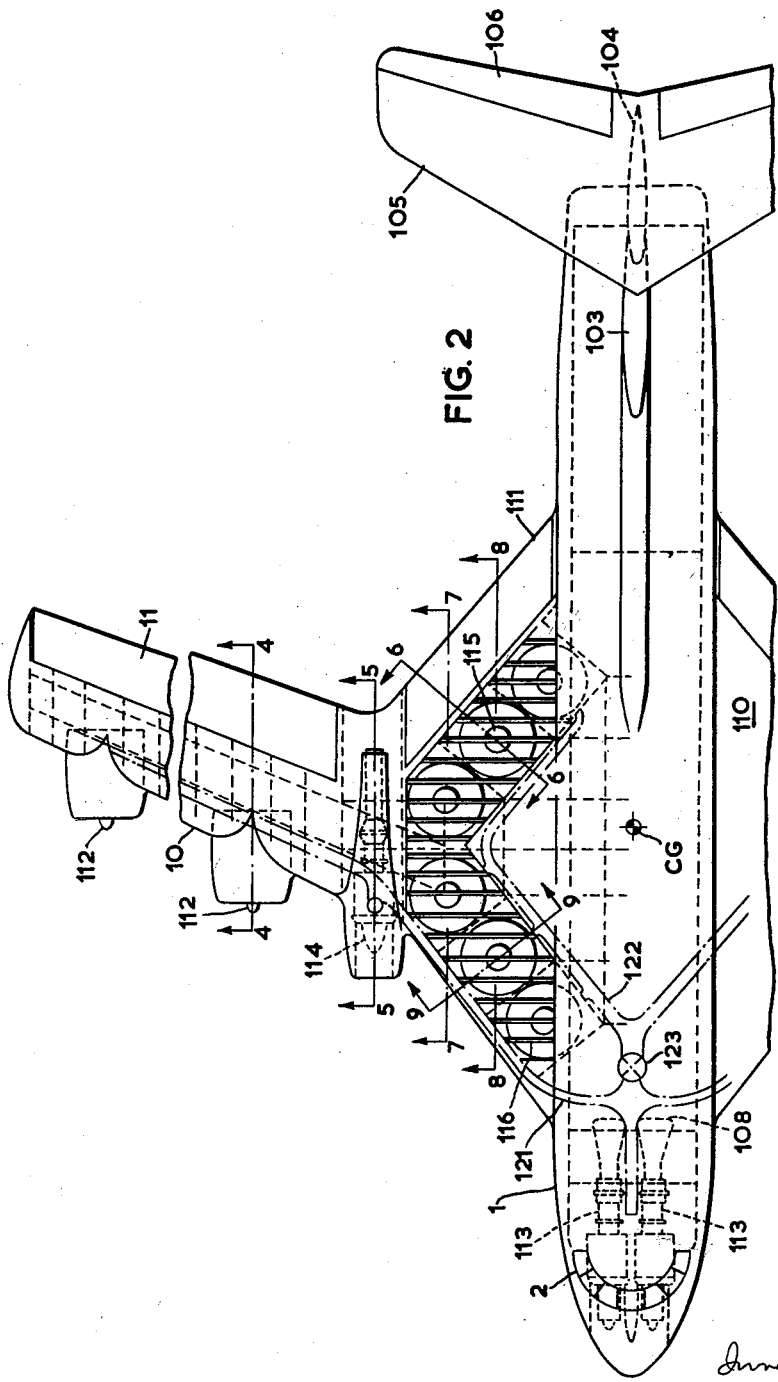

Nov. 12, 1963 R. F. CREASEY ET AL 3,110,456
VERTICAL TAKE-OFF AIRCRAFT
Filed Oct. 30, 1961 3 Sheets-Sheet 3

United States Patent Office 3,110,456
Patented Nov. 12, 1963

3,110,456
VERTICAL TAKE-OFF AIRCRAFT
Raymond Frederick Creasey and Joseph Thomas Froud, Lytham St. Annes, England, assignors to The English Electric Company Limited, London, England, a company of Great Britain
Filed Oct. 30, 1961, Ser. No. 148,539
Claims priority, application Great Britain Aug. 8, 1961
10 Claims. (Cl. 244—12)

The present invention relates to a development and modification of the vertical take-off aircraft according to patent application Ser. No. 148,540, filed on October 30, 1961, by Raymond Frederick Creasey, Gerald David Walley and Frank Gerrie Willox and assigned to The English Electric Company Limited.

The latter relates to an aircraft capable of lifting itself clear of the ground at a speed below wingborne speed and to accelerate to wingborne speed while off the ground. It can therefore be considered a vertical take-off aircraft although its installed vertical thrust is less than the weight of the aircraft, as distinguished from known vertical take-off aircraft capable of sustained flight below wingborne speed.

The aircraft according to the present invention is also distinguished from so-called hovercraft using the ground effect of a peripheral jet emerging from the base of the craft for increasing beyond the ambient pressure the pressure acting on said base enclosed by a jet curtain and thus to support itself at a low height above ground by a thrust smaller than the weight of the craft. However the height at which such hovercraft can sustain themselves by the said ground effect is in strict relationship to the area enclosed by the said jet curtain, so that such area has to be large if the height at which the craft can hover is to be of practically sufficient magnitude.

According to said patent application Ser. No. 148,540, a vertical thrust of a magnitude below the weight of the aircraft but exceeding the thrust required for hovering close to the ground is applied to the aircraft by means of a peripheral jet curtain which enables the aircraft to leap above the steady hover height, and at the same time a forward thrust is applied to the aircraft which is thus capable of acquiring wingborne speed while off the ground.

According to the present invention, the wing of the aircraft has a centre section of large rootchord, for example of rhomboid, circular or elliptic plan form arranged as a low wing with an aerofoil profile having a flat underside in static condition parallel to the ground at the lowest clearance compatible with the safe operation of flaps and louvres arranged thereon in their fully deflected position, and high aspect ratio dihedral and preferably swept back outer wing sections.

Propulsive ducted fans are arranged under the leading edges of said outer wing sections, the trailing edges of which are provided with full span slotted flaps, which in operation when deflected are blown by the efflux of said propulsive ducted fans.

Ducted fans are arranged with vertical axes embedded in said wing centre section as close as possible to the leading and trailing edges thereof and provided with deflectable entrance and outlet louvres, which are opened when said vertical ducted fans are in operation, and closed to make good the aerofoil profile of said centre section when said fans are out of operation. The efflux from these vertical ducted fans is merged by said outlet louvres into a substantially continuous cushion curtain around a cushion area under said wing centre section and middle of the fuselage.

The power for driving the propulsive as well as the horizontal ducted fans is derived from engines which may be a plurality of turbo-shaft engines themselves driving secondary compressors which supply air to the air turbines driving said ducted fans. Alternatively free turbine engines may be used with a mechanical drive to said ducted fans. Alternatively each ducted fan may be driven directly by a separate gas turbine. For take-off all engines are in operation, while for cruising flight all except those required for propulsion are shut down. Downwardly directed jets may be derived from said engines for controlling and stabilising the aircraft, particularly before attaining fully wingborne speed.

In order that the invention may be clearly understood, an embodiment thereof will now be described with reference to the accompanying drawings, in which:

FIG. 1 is a side elevation,
FIG. 2 a broken-off plan view, and
FIG. 3 a broken-off front elevation of a vertical take-off aircraft according to the present invention.
FIGS. 4 to 9 are sections on the lines 4—4, 5—5, 6—6, 7—7, 8—8 and 9—9, respectively of FIG. 2.

The fuselage 1 with crew cockpit 2 rests on a main undercarriage 118 and a nose wheel undercarriage 109 and carries at the centre of gravity CG of the plane as a whole, a wing composed of a low rhomboid centre section 110 and high aspect ratio dihedral outer sections 10. At the tail end the fuselage 1 carries a dorsal fin 103 and rudder 104 and a high tailplane 105 with elevators 106. A drop-down ramp 120 for loading cargo into the fuselage at the rear of the aircraft is indicated in FIG. 1 in chain-dotted lines.

Figure 5:
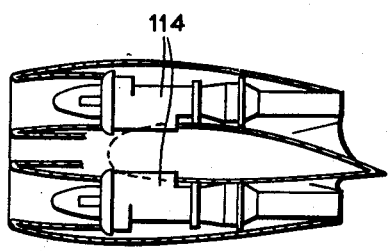

The propulsive power plant includes two engines 113 mounted side by side in the nose of the fuselage 1 under the crew cockpit 2, and four engines 114 arranged in pairs one on top of the other at the junctures of the wing sections 10 and 110 (FIGS. 3 and 5). The exhaust of the turbo-shaft engines 113 emerges through the nozzles 108 in the bottom of the fuselage 1 and form a part continuation of the jet cushion curtain. They can apply controlling pitching moments to the aircraft, particularly at speeds below the airspeed at which the elevators 106 become effective.

All the turbo shaft engines 113, 114 have their secondary compressors connected by compressed air ducts 121, 122 to propulsive ducted fans 112 mounted under the leading edges of the outer wing sections 10 and to ducted fans 115 mounted vertically in the wing centre section 110, respectively. These compressed air ducts are controlled by the pilot by means of valves, one of which, 123, is diagrammatically indicated in FIG. 2 so as to distribute the compressed air at will to the ducted fans 112 and/or 115 and if necessary to compensate for the failure of any one of said turbo-shaft engines by the use of the others.

In the embodiment described, substantially the whole power output of the turbo-shaft engines 113, 114 is used for producing the compressed air supplied to air turbines driving each of the ducted fans 112, 115 respectively. However, alternatively mechanical shaft drives could be arranged between the engines 113, 114 and the ducted fans 112, 115 or at least the vertical ducted fans 115 could be driven each directly by a separate gas turbine engine.

The high speed ratio dihedral and swept back outer wing sections 10 have slotted flaps 11 extending substantially over their full span, and when deflected, as shown in chain-dotted lines in FIG. 4, are blown by the efflux of the ducted fans 112 mounted under the leading edges of these outer wing sections whereby the high lift characteristics thereof are substantially increased while simultaneously a propulsive effect is produced by the use of the well known jet flap principle.

Figure 6:
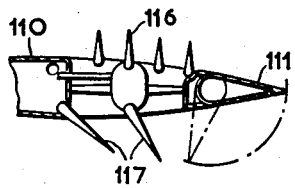
Figure 7:
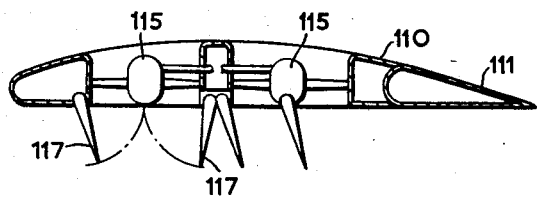
Figure 8:
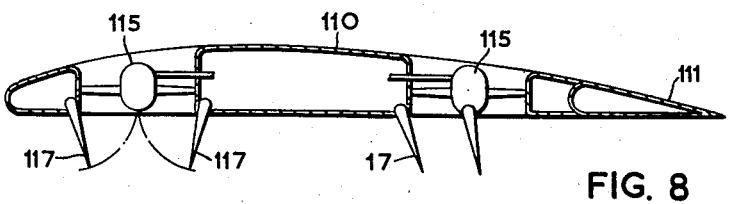
Figure 9:
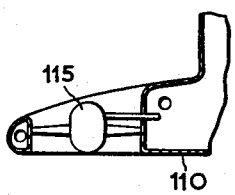

The vertically mounted ducted fans 115 are arranged in the trapezoidal centre section 110 of the wing having an aerofoil profile with a flat underside which in the static position is parallel to the ground at as short a distance compatible with the safe deflection by 90° of the trailing edge flaps 111 as possible, leaving a gap of say 12" between the trailing edges of said flaps and the ground. As indicated in FIG. 6, these flaps 111 may be deflected inward by more than 90°, say 100° about their hinge line. Exit louvres 117 are arranged flanking the ducted fans 115 or connecting their centres where these fans are flanked by the trailing edge flaps 111 (FIGS. 6, 7, 8). Intake louvres 116, 119 are also provided for the ducted fans 115 and turbo-shaft engines 113, respectively (FIGS. 2, 6 and 1, 3, respectively).

The operation of the vertical aircraft according to the present invention is in principle as described in said patent application Serial No. 148,540 and in more detail is as follows:

For vertical take-off an air cushoin is formed by the efflux of the ducted fans 115 under the centre section 110 of the wing and bottom of the middle of the fuselage 1, which form the cushion base area. The discrete circular columns of fan efflux air are merged into a substantially continuous curtain by the constraint applied to them by the exit louvres 117 in their deflected positions. In cruising flight the louvres 117 are used to close up the fan exits and make good the aerofoil shape of the centre section 110. While being substantially continuous, the air curtain need not be closed along the whole perimeter of the cushion area, and may for example be partly open at the front under the fuselage 1 (FIG. 1). The trailing edge flap 111 of the centre section 110 of the wing is of such a size that as much of the wing area aft of the cushion rear fans 115 as possible can be deflected vertically downward, thereby removing under-wing surface area adjacent to the ducted efflux, which both statically and at forward speed would have a detrimental effect on the fan and wing lift. When deflected at angles exceeding 90° this flap 111 combines with the exit louvres 117 in constraining the efflux of the ducted fans 115 into a continuous curtain.

According to said patent application Serial No. 148,540, the vertical take-off of the aircraft according to the invention is effected by an installed vertical thrust which is less than the all up weight of the aircraft (say 68% thereof), while having safety and control during the vertical take-off phase, even allowing for engine failure, as distinguished from conventional vertical take-off aircraft which must have an installed thrust substantially exceeding the all up weight to allow for engine failure and to fulfill control requirements.

This is attained as follows:

The slotted flaps 11 at the outer wing sections 10 are deflected to approxmiately 60° (FIG. 4), the trailing edge flap 111 of the centre section 110 is deflected approximately 100°, the inlet louvres 116 are opened and the outlet louvres 117 are set to control the air cushion under the centre section 110 of the wing and middle of the fuselage 1. The blades of the cushion fans 115 and propulsive fans 112 are set to zero pitch and the engines 113, 114 are run-up to take-off setting.

Then the ducted fans 112 and 115 are set to coarse pitch, and the cushion fans 115 exert a momentum thrust which is greatly augmented by the cushion lift. In the proximity of the ground the total lift is for example 1.6 of the all up weight, thus giving a vertical acceleration force of 0.6 of the all up weight. The amount of cushion augmentation is a function of the cushion area and curtain thickness and can be determined by the designed dimensions thereof.

This vertical accelerating force causes the aircraft to leap upward and, as the distance from the ground increases, the excess lift over all up weight and consequently the upward accelerating force decrease and eventually fade out completely. However, even at the top of the leap this momentum and thrust is still a great proportion of the all up weight. In the present embodiment, the aircraft will leap for example some 60 feet and at this height would have gained sufficient forward speed to augment by aerodynamic aerofoil action the lift of the fans 115 to a value greater than the all up weight.

This forward speed of the aircraft is attained as follows: as stated, at the start of the leap the propulsive fans 112 eject an air flow with a thrust of say 23% of the all up weight which air flow acts on the slotted flaps 11, which are deflected approximately 60°. Part of the air flow is thereby deflected directly downward, part of it is accelerated through the slot and, owing to the Coanda effect, clings to the upper surface of the flaps 11 and thus likewise flows downward. This produces both vertical and downward components of thrust causing the aircraft to move forward and contributing also to the vertical upward acceleration of the aircraft.

As the aircraft moves forward, the high velocity air flow through the slots which owing to the Coanda effect clings to the upper surface of the flaps 11 entrains the air flow over the upper surface of the outer wing sections 10, thus preventing any break away of the flow, and deflecting the air flow to a greater degree than the aerofoil profile could do as such. This produces a substantial increase in lift and enables the aircraft to be substantially wingborne at the top of the leap, while its forward velocity is still low, say about 25 feet per second. This is a particular application of the jet flap principle which is known in itself, while the use of propulsive fans to blow the slotted flaps is new and advantageous.

As soon as the aircraft has accelerated to a speed sufficient for being fully wingborne the cushion fans 115 are stopped, their louvres 116, 117 are closed and some of the turbo-shaft engines, say four of six, are shut down and those remaining in operation are used for driving the propulsive fans 112 only. Already during the leap and the subsequent transition to wingborne flight the trailing edge flaps 111 of the centre section 110 can be returned to the undeflected position, and with the co-ordinated rear deflection of said louvres 117 allows the air cushion partially to flow off rearward and to produce an additional forward propulsive thrust, while at the same time inducing a jet flap flow over the aerofoil of the centre section 110 and so producing an additional lift.

At the same time the slotted flaps 11 of the outer wing sections 10 are returned towards their undeflected position so as to help the increase of the forward accelerating force. As soon as the aircraft is fully wingborne, the slotted flaps are completely returned to their undeflected position.

What we claim as our invention and desire to secure by Letters Patent is:

1. An aeroplane capable of lifting itself clear of the ground at a speed below wingborne speed and of accelerating to wingborne speed while off the ground, comprising in combination: a fuselage, an aeroplane wing having a center section of comparatively large root chord arranged in low wing position on said fuselage and having an airfoil profile with a flat underside in the static position parallel to the ground at close clearance two dihedral high aspect ratio outer wing sections of comparatively small root chord connected to said center section, substantially vertical air jet generating means mounted in said center section in operation producing a peripheral air curtain on the underside of said center section of a thrust of a magnitude below the weight of said aeroplane but exceeding the thrust required for steadily hovering close to the ground and enabling said aeroplane to leap above the height of steadily hovering, and propulsive means having at least a forward thrust component in operation accelerating said aeroplane to windborne speed.

2. An aeroplane as claimed in claim 1, wherein said wing center section is of rhomboid plan form.

3. An aeroplane as claimed in claim 1, comprising controllable vertical jet nozzles arranged on the tail end and nose end of said fuselage for pitch control, and controllable vertical jet nozzles arranged on the tips of said outer wing sections for roll control of said aeroplane below wingborne speed.

4. An aeroplane as claimed in claim 1, wherein said propulsive means are mounted on said outer wing sections and comprising jet flaps mounted on the trailing edge of said outer wing sections and in operation blown by the efflux of said propulsive means at the lower range of the wingborne speed of said aeroplane.

5. An aeroplane as claimed in claim 1, wherein said propulsive means are ducted fans mounted under the leading edges of said outer wing sections, and comprising full-span slotted flaps mounted at the trailing edges of said outer wing sections, nad when deflected blown by the efflux of said propulsive ducted fans.

6. An aeroplane as claimed in claim 1, wherein said substantially vertical air jet generating means are ducted fans embedded in said wing center section close to the leading and trailing edges thereof.

7. An aeroplane as claimed in claim 6, comprising deflectable louvres arranged in said wing center section at the entrances and at the outlets of said ducted fans, arranged to be opened when said ducted fans are in operation and merging the efflux thereof into a substantially continuous curtain around a cushion area under said wing center section, and to be closed so as to make good the aerofoil profile of said wing center section when said ducted fans are out of operation.

8. An aeroplane as claimed in claim 6, comprising at least one turbo-shaft engine, a secondary compressor coupled to said turbo-shaft engine, and at least one air turbine in ducted connection with said secondary compressor and coupled with said propulsive and said substantially vertical ducted fans.

9. An aeroplane as claimed in claim 6, comprising at least one free gas turbine engine coupled mechanically with said propulsive and said substantially vertical ducted fans.

10. An aeroplane as claimed in claim 9, comprising a plurality of free gas turbine engines, each coupled with one of said ducted fans.

References Cited in the file of this patent

UNITED STATES PATENTS 3,070,327    Dornier _____ Dec. 25, 1962

FOREIGN PATENTS 847,868    Great Britain _____ Sept. 14, 1960